(12) United States Patent
Abe et al.

(10) Patent No.: US 9,560,244 B2
(45) Date of Patent: Jan. 31, 2017

(54) IMAGE PICKUP DEVICE AND IMAGE DISPLAY METHOD

(71) Applicant: Sony Corporation, Tokyo (JP)

(72) Inventors: Wataru Abe, Tokyo (JP); Genta Yagyu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/407,639

(22) PCT Filed: May 1, 2013

(86) PCT No.: PCT/JP2013/002905
§ 371 (c)(1),
(2) Date: Dec. 12, 2014

(87) PCT Pub. No.: WO2013/190762
PCT Pub. Date: Dec. 27, 2013

(65) Prior Publication Data
US 2015/0146051 A1 May 28, 2015

(30) Foreign Application Priority Data

Jun. 21, 2012 (JP) ................................ 2012-139893

(51) Int. Cl.
| | |
|---|---|
| *H04N 5/222* | (2006.01) |
| *G03B 13/06* | (2006.01) |
| *G03B 13/36* | (2006.01) |
| *G03B 19/12* | (2006.01) |
| *H04N 5/225* | (2006.01) |
| *H04N 5/232* | (2006.01) |
| *G02B 7/28* | (2006.01) |

(52) U.S. Cl.
CPC ............ *H04N 5/2228* (2013.01); *G03B 13/06* (2013.01); *G03B 13/36* (2013.01); *G03B 19/12* (2013.01); *H04N 5/2254* (2013.01); *H04N 5/2258* (2013.01); *H04N 5/23245* (2013.01); *H04N 5/23293* (2013.01); *G02B 7/28* (2013.01)

(58) Field of Classification Search
CPC .. H04N 5/2228; H04N 5/2258; H04N 5/2254; H04N 5/23245; G03B 13/36; G03B 13/06; G03B 19/12; G02B 7/28
USPC ....................................... 348/207.1
See application file for complete search history.

(56) References Cited

U.S. PATENT DOCUMENTS

| | | | |
|---|---|---|---|
| 5,021,818 A * | 6/1991 | Satoh ..................... | G03B 7/087 396/234 |
| 6,081,371 A * | 6/2000 | Shioda ............... | G02B 21/0012 359/369 |
| 2008/0159730 A1* | 7/2008 | Yagyu .................... | G03B 19/12 396/354 |

(Continued)

*Primary Examiner* — Pritham Prabhakher
(74) *Attorney, Agent, or Firm* — Chip Law Group (57) ABSTRACT

An image pickup device includes a first image sensor for photoelectrically converting subject light and generating an image, a second image sensor for photoelectrically converting the subject light and generating an image for a live view, a first optical member for transmitting the subject light and allowing the subject light to enter the first image sensor, and at the same time, reflecting the subject light, and a second optical member for leading the subject light reflected by the first optical member to the second image sensor and allowing the subject light to enter the second image sensor.

10 Claims, 10 Drawing Sheets

(56) References Cited

U.S. PATENT DOCUMENTS

| | | | |
|---|---|---|---|
| 2008/0266405 A1* | 10/2008 | Tachibana | G03B 17/00 348/208.6 |
| 2009/0016708 A1* | 1/2009 | Takeuchi | G03B 13/36 396/104 |
| 2009/0231465 A1* | 9/2009 | Senba | H04N 5/23248 348/229.1 |
| 2009/0244310 A1* | 10/2009 | Kuwazoe | H04N 5/2258 348/222.1 |
| 2010/0328780 A1* | 12/2010 | Tocci | G02B 5/04 359/636 |
| 2011/0134293 A1* | 6/2011 | Tanaka | G02B 7/34 348/280 |
| 2013/0002925 A1* | 1/2013 | Lin | G02B 26/02 348/333.08 |

* cited by examiner

IMAGE PICKUP DEVICE AND IMAGE DISPLAY METHOD

TECHNICAL FIELD

The present technique relates to an image pickup device and an image display method.

BACKGROUND ART

In recent years, regarding a digital camera, a single-lens reflex camera which displays an output of an image sensor as a live view in order to observe a subject during photographing has been proposed other than a digital camera using an optical finder (Patent Document 1).

CITATION LIST

Patent Document

Patent Document 1: JP 2007-243561 A

SUMMARY OF THE INVENTION

Problems to be Solved by the Invention

The single-lens reflex camera disclosed in Patent Document 1 is a type which switches routes of light to a sensor for recording and a sensor for a live view (LV) by a movable mirror, and the single-lens reflex camera stops the sensor for LV and starts the sensor for recording at the timing of switching a state from a mirror-down state (live view) to a mirror-up state (recording). There is a problem in that the live view cannot be displayed during data transfer and a blackout occurs because the image for LV is displayed by the sensor for recording.

The present technique has been made in consideration of the problem. A purpose of the present technique is to provide an image pickup device and an image display method which can display a live view without interruption.

Solutions to Problems

To solve the above-mentioned problem, a first technique is an image pickup device including a first image sensor configured to photoelectrically convert subject light and generate an image, a second image sensor configured to photoelectrically convert the subject light and generate an image for a live view, a first optical member configured to transmit the subject light and allow the subject light to enter the first image sensor and at the same time reflects the subject light, and a second optical member configured to lead the subject light reflected by the first optical member to the second image sensor and allow the subject light to enter the second image sensor.

Also, a second technique is an image display method for displaying an image generated by a first image sensor and an image generated by a second image sensor as a live view image in an image pickup device including the first image sensor for photographically converting subject light and generating the image, the second image sensor for photographically converting the subject light and generating the image for the live view, a first optical member for transmitting the subject light and allowing the subject light to enter the first image sensor, a second optical member for leading the subject light reflected by the first optical member to the second image sensor and allowing the subject light to enter the second image sensor, and a display unit for displaying the image.

Effects of the Invention

A live view can be displayed without interruption according to the present technique.

MODE FOR CARRYING OUT THE INVENTION

An embodiment of the present technique will be described below with reference to the drawings. The description will be in the following order.

<1. Embodiment>
[1-1. Structure of image pickup device]
[1-2. Live view display of image pickup device]
<2. Variation>

1. Embodiment

1-1. Structure of Image Pickup Device

Figure 1:
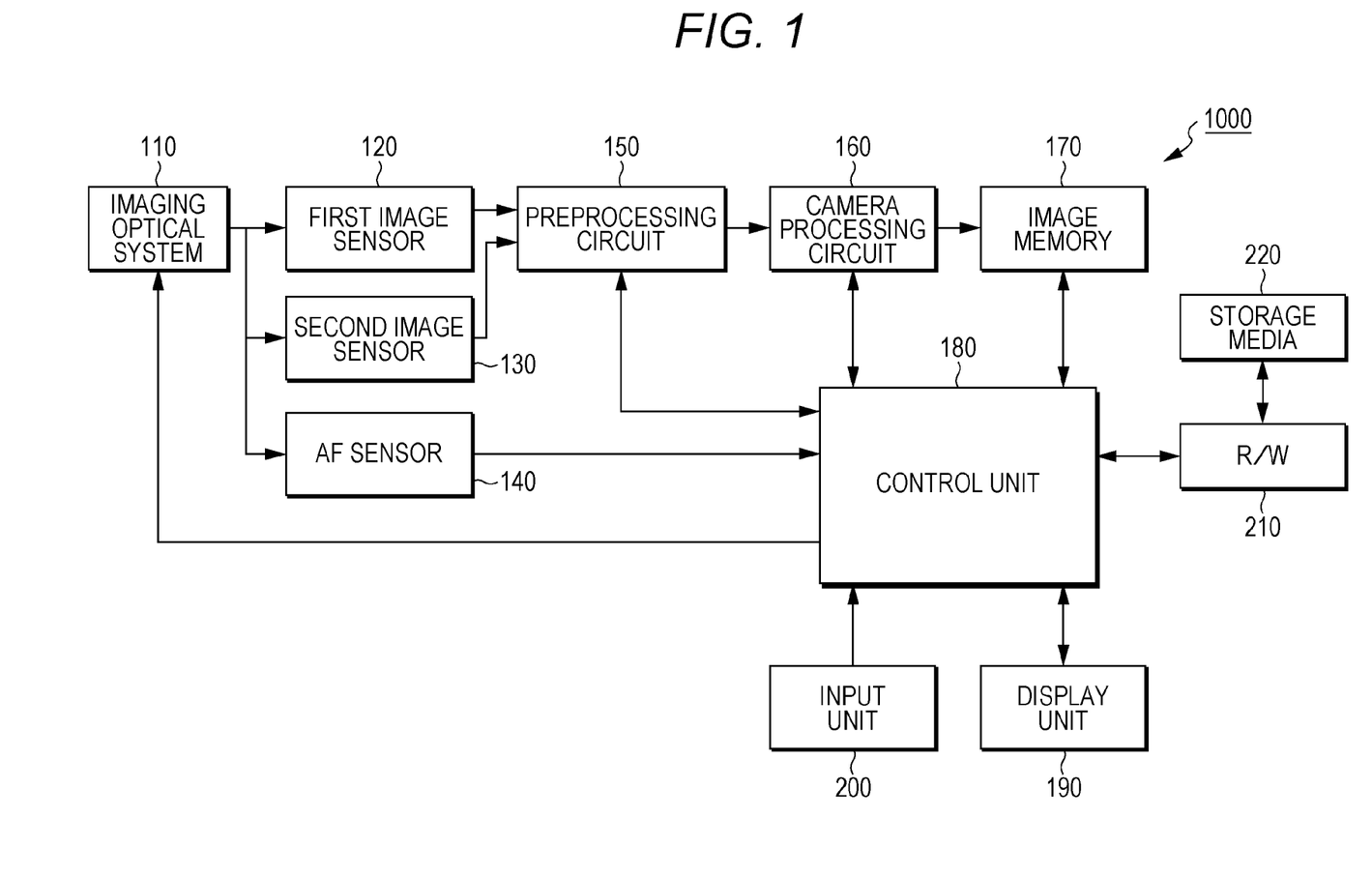
FIG. 1 is a block diagram of a configuration of an image pickup device according to the present technique.

First, a configuration of an image pickup device 1000 will be described. FIG. 1 is a block diagram of a whole configuration of the image pickup device 1000. The image pickup device 1000 includes an imaging optical system 110, a first image sensor 120, a second image sensor 130, an auto focus (AF) sensor 140, a preprocessing circuit 150, a camera processing circuit 160, an image memory 170, a control unit 180, a display unit 190, an input unit 200, a reader/writer (R/W) 210, and storage media 220.

The imaging optical system 110 includes a photographing lens 111 to collect subject light on the first image sensor 120, a semi-transmissive film which reflects and transmits the subject light, a semi-transmissive mirror, an optical lens for the second image sensor 130, and the like. Also, the imaging optical system 110 includes a drive mechanism for moving the lens to adjust the focus and perform zooming, a shutter mechanism, an iris mechanism, and the like. The subject light obtained via the imaging optical system 110 enters the first image sensor 120, the second image sensor 130, and the auto focus (AF) sensor.

The first image sensor 120 photoelectrically converts the incident light from the subject into a charge amount and outputs it as image data. The image data output from the first image sensor 120 is output to the preprocessing circuit 150. A charge coupled device (CCD), a complementary metal oxide semiconductor (CMOS), and the like are used as the first image sensor 120. The first image sensor 120 is an image sensor to generate an image finally obtained by photographing.

The second image sensor 130 photoelectrically converts the incident light from the subject into the charge amount and outputs it as the image data. The CCD, the CMOS, and the like are used as the second image sensor 130. The second image sensor 130, which will be described below in detail, is an image sensor to generate an image for a live view.

The AF sensor 140 is a sensor for auto-focusing of, for example, a phase difference detection method and a contrast AF method. The incidence of the subject light into the first image sensor 120, the second image sensor 130, and the AF sensor 140 will be described below in detail.

The preprocessing circuit 150 performs a sampling hold relative to analog image signals output from the first image sensor 120 and the second image sensor 130 so as to excellently maintain a signal/noise (S/N) ratio by the correlated double sampling (CDS). In addition, the preprocessing circuit 150 controls a gain by performing auto gain control (AGC), and outputs a digital image signal by performing an analog/digital (A/D) conversion.

The camera processing circuit 160 performs signal processing relative to the image signal from the preprocessing circuit 150. The signal processing is, for example, white balance adjustment processing, color correction processing, luminance correction, gamma correction processing, Y/C conversion processing, and auto exposure (AE) processing.

The image memory 170 is a volatile memory such as a buffer memory including a dynamic random access memory (DRAM). The image memory 170 temporarily stores the image data to which predetermined processing is performed by the preprocessing circuit 150 and the camera processing circuit 160.

The control unit 180 includes, for example, a CPU, a RAM, and a ROM. A program to be read and operated by the CPU and the like is stored in the ROM. The RAM is used as a work memory of the CPU. The CPU controls the whole image pickup device 1000 by executing various processing according to the program stored in the ROM and issuing a command. Also, the control unit 180 controls a live view display on the display unit 190. The live view display will be described below in detail.

The display unit 190 is a display unit such as a liquid crystal display (LCD), a plasma display panel (PDP), and an organic electro luminescence (EL) panel. Under the control of the control unit 180, the display unit 190 displays, for example, the live view, a through image, and an image recorded in the storage media 220 by displaying an image according to the image signal supplied from the control unit 180.

The input unit 200 includes, for example, a power button to switch on/off of a power source, a shutter button to instruct the control unit 180 to start the recording of a picked-up image, an operation element for zoom adjustment, and a touch screen integrated with the display unit 190. When an input has been performed relative to the input unit 200, a control signal according to the input is generated and output to the control unit 180. The control unit 180 performs arithmetic processing and control corresponding to the control signal.

The R/W 210 is an interface which is connected to a recording media 22 for recording the image data generated by imaging and the like. The R/W 210 writes the data supplied from the control unit 180 to the storage media 220. Also, the R/W 210 outputs the data read from the storage media 220 to the control unit 180. The storage media 220 is mass storage media such as a hard disk, a memory stick (registered trademark of Sony Corporation), and an SD memory card. The image is stored in a compressed state based on a standard such as JPEG. Also, information regarding the stored image and exchangeable image file format (EXIF) data including additional information such as the imaged data are associated with the image and stored.

Figure 2:
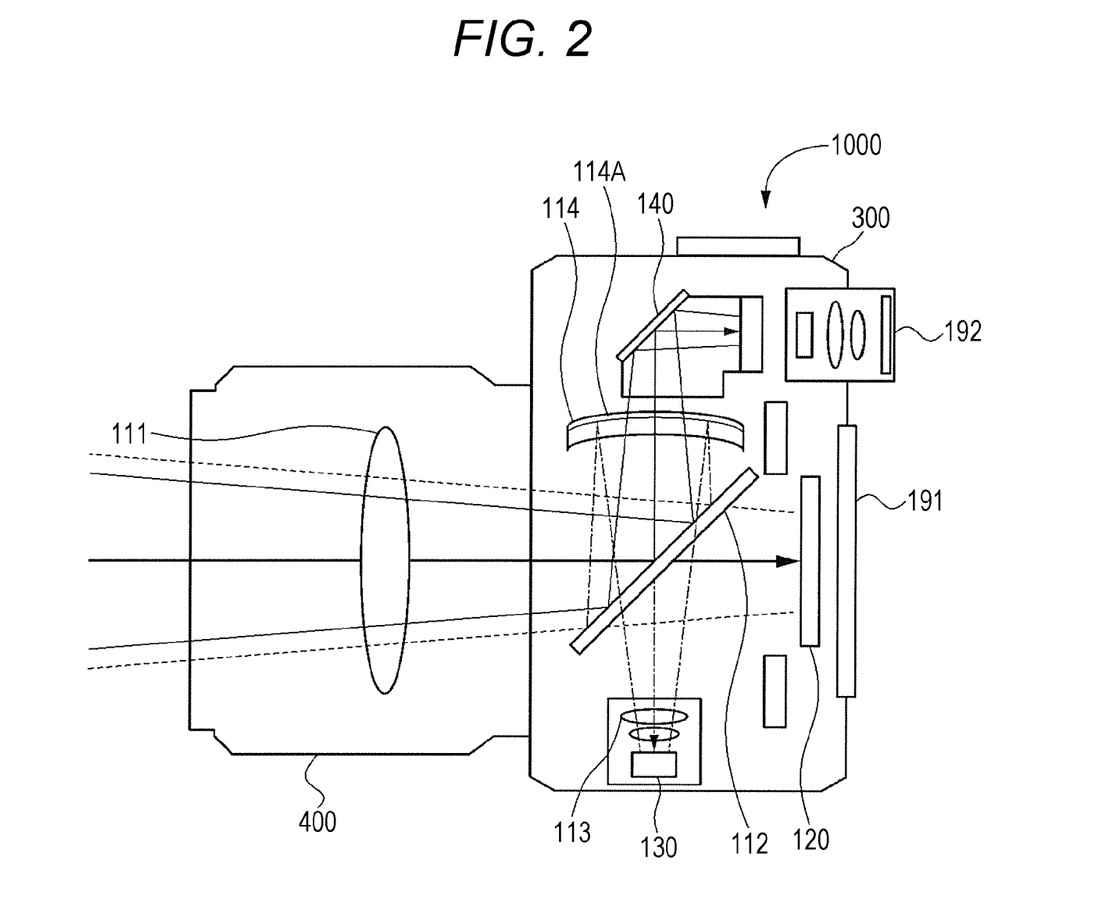
FIG. 2 is a cross sectional schematic view of an outline structure of the image pickup device.

Next, a mechanical structure of the imaging optical system, which is mainly the image sensor, the photographing lens 111 and the like, of the image pickup device 1000 will be described. FIG. 2 is a cross sectional schematic view of an outline structure of the image pickup device 1000 according to the present technique.

As illustrated in FIG. 2, a lens barrel 400 which is exchangeable is attached to a housing 300 for configuring the image pickup device 1000. The photographing lens 111, a diaphragm, and the like are provided in the lens barrel 400. The photographing lens 111 is driven by a focus driving system (not shown) and is able to perform AF operation. The lens barrel 400 may be integrated with the housing 300.

The first image sensor 120, which is the image sensor for generating the photographing image, is provided in the housing 300. The first image sensor 120 is the image sensor such as the CCD and the CMOS as described above. The first image sensor 120 photographically converts the subject light for entering via the photographing lens 111 into the charge amount and generates the image. The predetermined signal processing such as the white balance adjustment processing and the gamma correction processing is performed to the image signal, and the image signal is finally stored in the storage media in the image pickup device 1000, an external memory, and the like as the image data. Also, a shutter is provided in front of the first image sensor 120. Either a mechanical shutter and an electric shutter can be applied to the present technique.

Also, the AF sensor 140 which is the image sensor for the AF is provided in the housing 300. For example, an AF sensor of the phase difference detection method can be used as the AF sensor 140. However, the AF sensor 140 is not limited to that of the phase difference detection method, and the AF sensor 140 may have a function of an AF sensor of the contrast AF method. As a method of the AF, the phase difference detection method and the contrast AF method may be combined. In order to successfully perform the AF to a subject having low contrast or a subject in a dark place, AF auxiliary light may be generated and an AF evaluation value may be formed from return light.

Also, in the housing 300, the semi-transmissive film 112 is provided between the photographing lens 111 and the first image sensor 120 in the housing 300. The subject light enters the semi-transmissive film 112 via the photographing lens 111. A part of the subject light for entering via the photographing lens 111 is reflected by the semi-transmissive film 112 to a direction of the AF sensor 140 in the above, and the semi-transmissive film 112 transmits the other part of the subject light to the first image sensor 120.

Also, an imaging optical system for the live view is provided in the housing 300. The imaging optical system for the live view includes an optical lens 113 for the live view and the second image sensor 130. The optical lens 113 for the live view allows the second image sensor 130 to form the image of the subject light. The second image sensor 130 is an image sensor for generating the live view image. The second image sensor 130 is the image sensor, for example, the CCD and the CMOS. The second image sensor 130 photographically converts the entering subject light into the charge amount and generates the image for the live view.

Also, a semi-transmissive mirror 114 is provided in the housing 300. The semi-transmissive mirror 114 is provided so as to be positioned in a place above of the first image sensor 120 in the housing 300. The semi-transmissive mirror 114 includes a reflection surface 114A on the upper side (a direction apart from the first image sensor 120). Apart of the subject light, which is reflected by the semi-transmissive film 112 to the direction of the AF sensor 140 above, is reflected by the semi-transmissive mirror 114 to the imaging optical system for the live view below. A detailed structure of the semi-transmissive mirror 114 will be described below.

A broken line indicates a luminous flux of the subject light for entering the first image sensor 120 in FIG. 2. Also, an alternate long and short dashed line indicates a luminous flux of the subject light for being reflected by the semi-transmissive film 112 and the semi-transmissive mirror 114 and entering the second image sensor 130. In addition, a solid line indicates a luminous flux of the subject light for being reflected by the semi-transmissive film 112 and entering the AF sensor 140.

A display 191 having a function as an electronic viewfinder is provided in the housing 300 of the image pickup device 1000. The display 191 is a flat display and the like such as a liquid crystal display (LCD) and an organic EL (Electroluminescence: electroluminescent effect). The image data is obtained by performing processing to the image signal extracted from the first image sensor 120 or the second image sensor 130 by a signal processing unit (not shown). The obtained image data is supplied to the display 191, and the display displays the data as a real-time image (so-called through image). The display 191 is provided on the backside of the housing in FIG. 2. However, the position of the display 191 is not limited to this, and the display 191 may be provided on the upper surface of the housing or may be a movable type or a removable type.

Further, an electronic viewfinder 192 (EVF: electronic view finder) is provided in the housing. The electronic viewfinder 192 includes, for example, the liquid crystal display and the organic EL display. The image data is obtained by performing the processing to the image signal extracted from the first image sensor 120 or the second image sensor 130 by the signal processing unit (not shown). The obtained image data is supplied to the electronic viewfinder 192, and the electronic viewfinder 192 displays the data as the real-time image (through image).

The display 191 and the electronic viewfinder 192 correspond to the display unit 190 in the block diagram in FIG. 1. The display on the display 191 and the electronic viewfinder 192 of the image generated by the first image sensor 120 and the image generated by the second image sensor 130 will be described below in detail.

Figure 3:
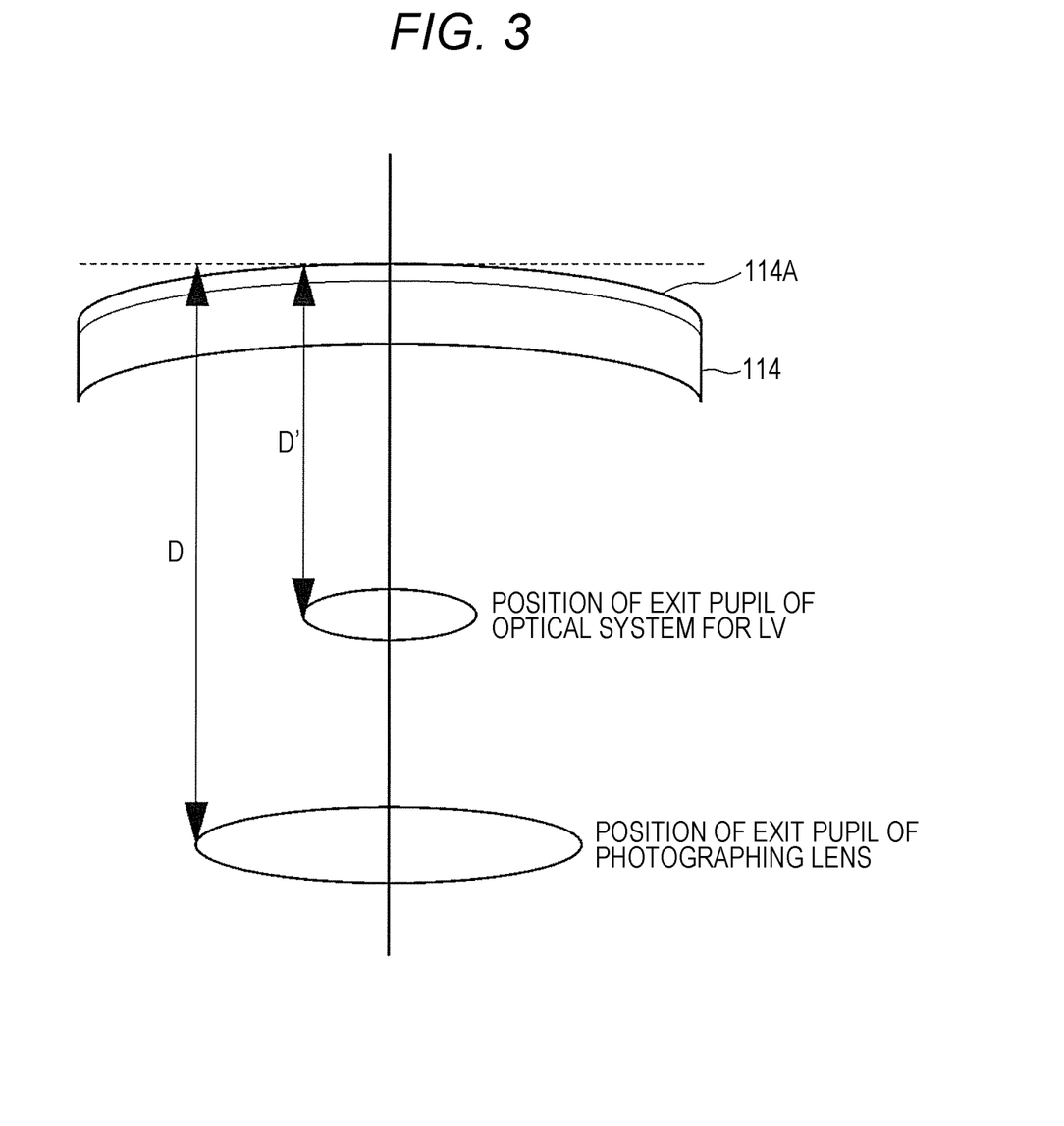
FIG. 3 is a diagram to describe a shape of a semi-transmissive mirror.

Next, a structure of the semi-transmissive mirror 114 will be described. As illustrated in FIG. 2, the semi-transmissive mirror 114 has a predetermined radius of curvature and is formed in a curved shape in a side view (concave shape relative to an object). As illustrated in FIG. 3, it is preferable that the radius of curvature of the semi-transmissive mirror 114 satisfy the condition indicated by the formula 1 below while it is assumed that an air conversion distance between a position of an exit pupil of the photographing lens 111 and the surface of the semi-transmissive mirror 114 be D and an air conversion distance between a position of an exit pupil of the imaging optical system for the live view 113 and the semi-transmissive mirror 114 be D'.

$$0.25 < \frac{D \cdot D'}{R \cdot (D + D')} < 1.08 \qquad \text{[Mathematical Formula 1]}$$

Figure 4:
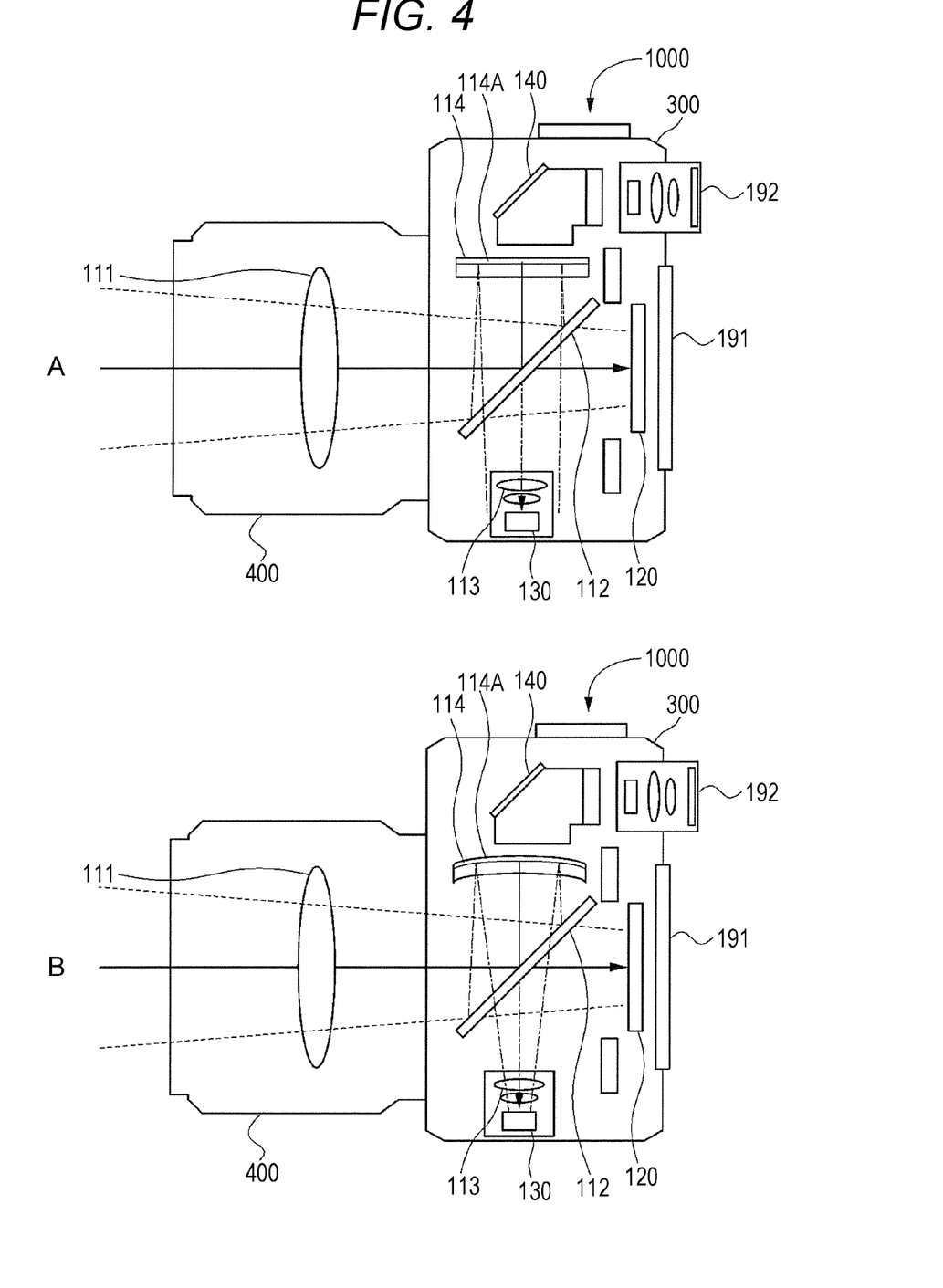
FIG. 4A is a diagram of a shape of a flat semi-transmissive mirror.
FIG. 4B is a diagram of a shape of a curved semi-transmissive mirror according to the present technique.

The reason why the semi-transmissive mirror 114 has the radius of curvature in this way will be described with reference to FIGS. 4A and 4B. FIG. 4A is a diagram of a case where the semi-transmissive mirror 114 does not have the above-mentioned radius of curvature and has a flat shape. FIG. 4B is a diagram of a case where the semi-transmissive mirror 114 has the radius of curvature.

The subject light reflected by the semi-transmissive film 112 is reflected by the semi-transmissive mirror 114 and enters the imaging optical system for the live view. However, when the semi-transmissive mirror 114 does not have the radius of curvature, the subject light which is reflected by the semi-transmissive film 112 and then reflected by the semi-transmissive mirror 114 in the direction of the imaging optical system for the live view does not enter the imaging optical system for the live view as illustrated in FIG. 4A. Then, decrease in light quantity in the peripheral region occurs.

On the other hand, as illustrated in FIG. 4B, when the semi-transmissive mirror 114 has the radius of curvature, the subject light which is reflected by the semi-transmissive mirror 114 and proceeds to the direction of the imaging optical system for the live view certainly enters the imaging optical system for the live view. Accordingly, the decrease in light quantity in the peripheral region can be prevented.

Figure 5:
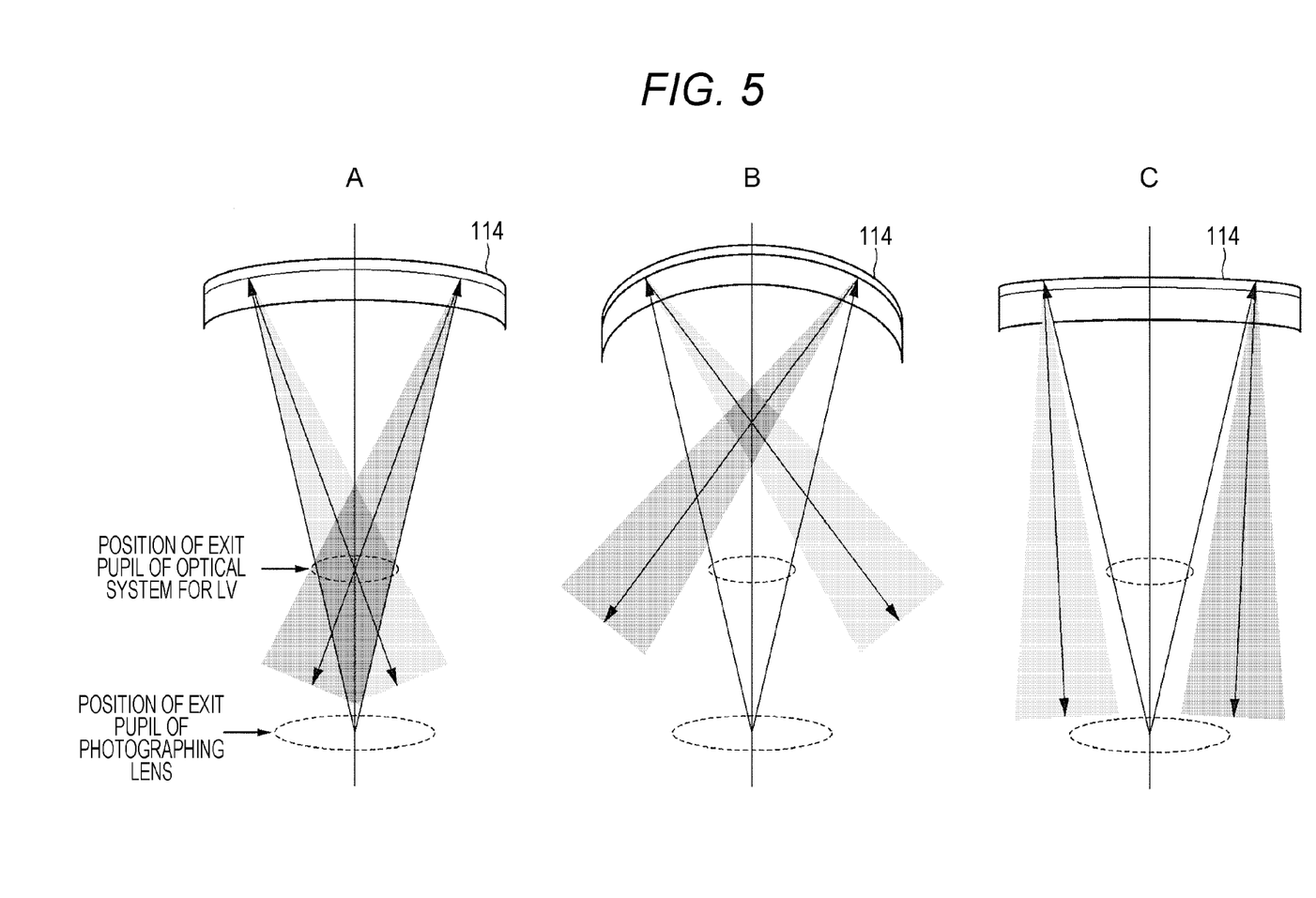
FIG. 5A is a diagram of a semi-transmissive mirror having an appropriate radius of curvature according to the present technique.
FIG. 5B is a diagram of a semi-transmissive mirror having a small radius of curvature.
FIG. 5C is a diagram of a semi-transmissive mirror having a large radius of curvature.

However, it is not enough for the semi-transmissive mirror 114 to have a curved surface, and it is necessary that the semi-transmissive mirror 114 have the radius of curvature for satisfying the above-mentioned formula 1. FIGS. 5A to 5C are diagrams to describe the decrease in light quantity in the peripheral region of the semi-transmissive mirror 114. In FIGS. 5A to 5C, a region expressed by a number of dots is the luminous flux of the subject light after it has been reflected by the semi-transmissive mirror 114.

FIG. 5A indicates the semi-transmissive mirror 114 having the radius of curvature for satisfying the formula 1. In this case, the luminous flux of the subject light passes through the whole area of the exit pupil of the imaging optical system for the live view, and the decrease in light quantity in the peripheral region does not occur.

On the other hand, FIG. 5B is a case where the radius of curvature of the semi-transmissive mirror 114 is smaller than the condition indicated by the formula 1. In this case, the luminous flux of the subject light reflected by the semi-transmissive mirror 114 does not enter the exit pupil of the imaging optical system for the live view, and the decrease in light quantity in the peripheral region occurs.

In addition, FIG. 5C is a case where the radius of curvature of the semi-transmissive mirror 114 is larger than the condition indicated by the formula 1. Also in this case, the luminous flux of the subject light reflected by the semi-transmissive mirror 114 does not enter the exit pupil of the imaging optical system for the live view, and the decrease in light quantity in the peripheral region occurs.

Therefore, it is not enough for the semi-transmissive mirror 114 to simply have the radius of curvature and be formed in the curved shape in a side view, and it is necessary to satisfy the above-mentioned formula 1.

Next, the reflection surface 114A of the semi-transmissive mirror 114 will be described. As illustrated in FIG. 2, it is preferable that the reflection surface 114A of the semi-transmissive mirror 114 be provided on the side apart from the first image sensor 120 of the semi-transmissive mirror 114. This point will be described with reference to FIGS. 6A and 6B.

Figure 6:
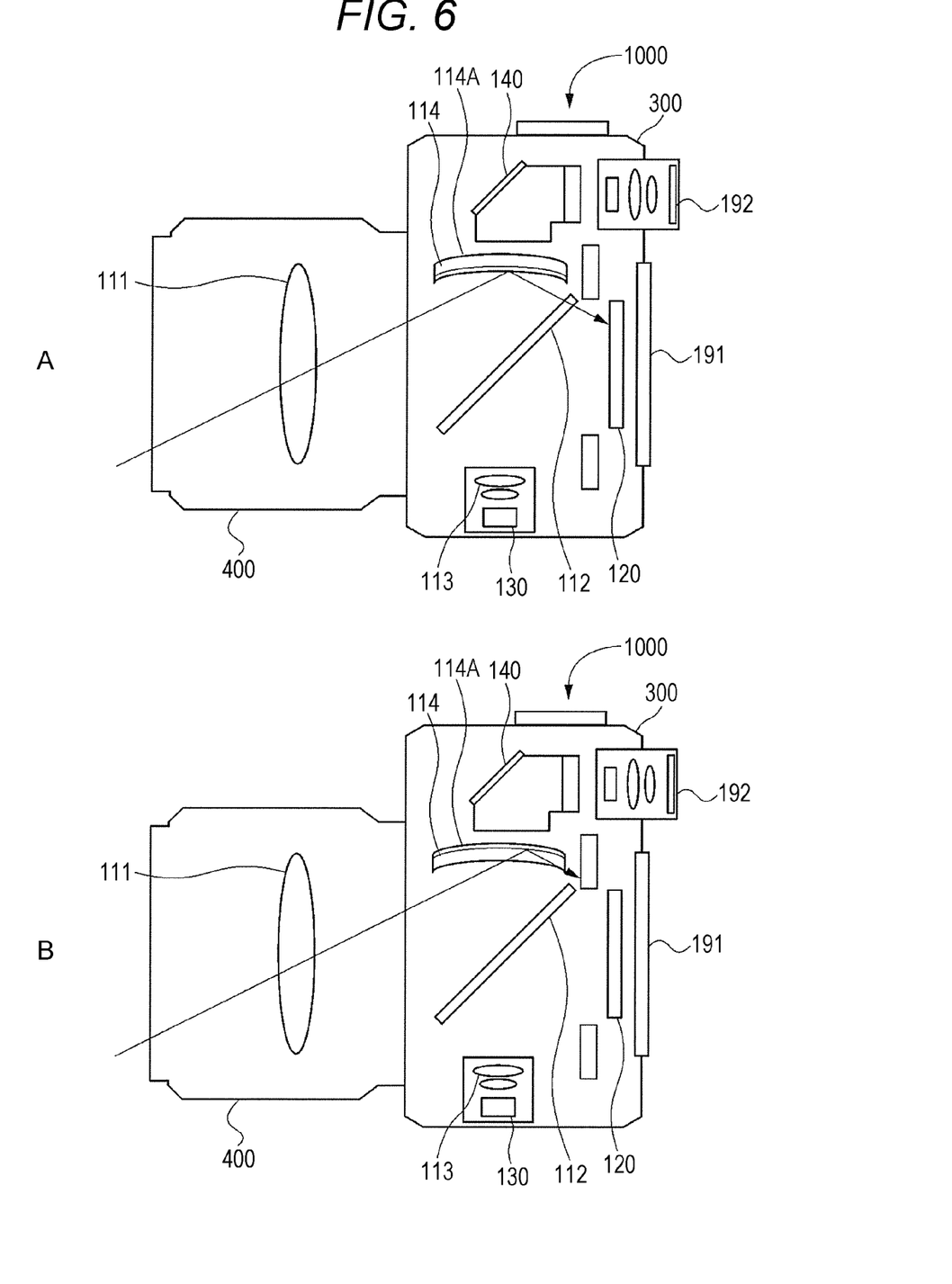
FIG. 6A is a diagram of a case where a reflection surface of the semi-transmissive mirror is provided on a surface close to a first image sensor.
FIG. 6B is a diagram of a case where the reflection surface of the semi-transmissive mirror according to the present technique is provided on a surface apart from the first image sensor.

FIG. 6A indicates a case where the reflection surface 114A is provided on a lower side of the semi-transmissive mirror 114, that is, a position close to the first image sensor 120. In this case, as illustrated in FIG. 6A, there is a possibility that the subject light for entering via the photographing lens 111 is reflected by the semi-transmissive mirror 114 and enters the first image sensor 120 as harmful light.

As illustrated in FIG. 6B, the reflection surface 114A is provided on the upper surface of the semi-transmissive mirror 114, that is, a position farthest from the first image sensor 120. Accordingly, as can be understood by FIG. 6B, the subject light for entering via the photographing lens 111 can be prevented from being reflected by the semi-transmissive mirror 114 and entering the first image sensor 120. The reflection surface 114A is made, for example, by providing a half mirror coat on the semi-transmissive mirror 114 by evaporation coating.

The entrance of the harmful light into the first image sensor 120 can be prevented by separating the position of the semi-transmissive mirror 114 itself from the first image sensor 120. However, there is a possibility that this has an effect on the size of the image pickup device 1000 and interferes the miniaturization of the image pickup device 1000. By separating the reflection surface 114A from the semi-transmissive mirror 114 as described above, the entrance of the harmful light can be prevented without interfering miniaturization of the image pickup device 1000.

Figure 7:
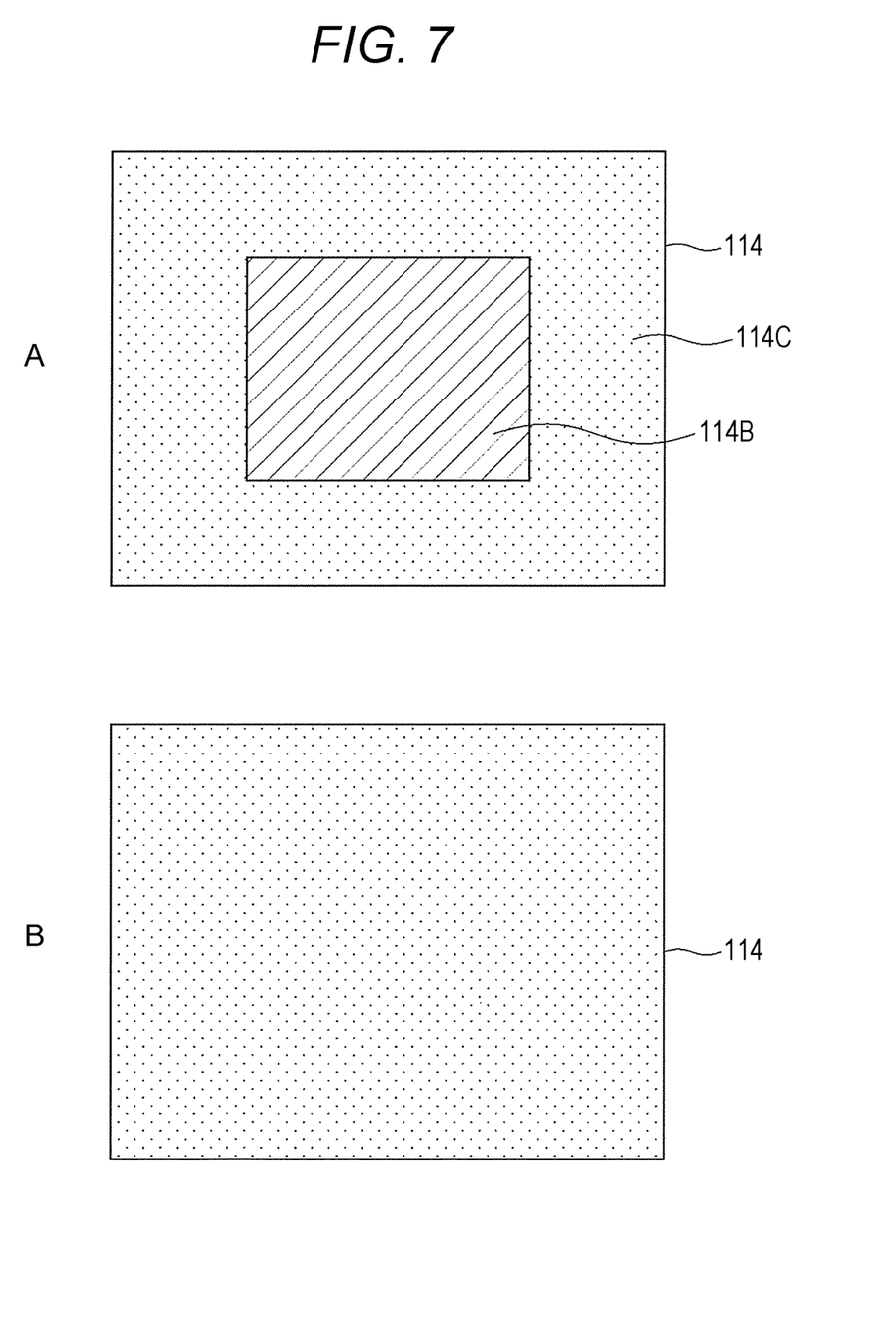
FIG. 7A is a plan view of the semi-transmissive mirror including two regions having different transmittance from each other.
FIG. 7B is a plan view of the semi-transmissive mirror having uniform transmittance.

Next, a transmittance of the semi-transmissive mirror 114 will be described. The semi-transmissive mirror 114 may have different transmittance for each predetermined region. This point will be described with reference to FIGS. 7A and 7B. FIG. 7A is a plan view of the semi-transmissive mirror 114. For example, as illustrated in FIG. 7A, the semi-transmissive mirror 114 may include a first transmission region 114B and a second transmission region 114C which has a different transmittance from that of the first transmission region 114B. As illustrated in FIG. 2, the AF sensor 140 is provided in a direction in which the semi-transmissive mirror 114 transmits the subject light, and the subject light for having passed through the first transmission region 114B of the semi-transmissive mirror 114 enters the AF sensor 140.

In the example of FIG. 7A, for example, a ratio between the transmission and the reflection of the first transmission region 114B becomes 9:1. On the other hand, the ratio between the transmission and the reflection of the second transmission region 114C becomes 5:5.

Accordingly, the subject light with high luminance, which has passed through the first region 114B having high transmittance, can enter the AF sensor 140, and auto-focusing processing can be certainly performed by the AF sensor 140.

The above-mentioned ratio between the transmission and the reflection is only exemplary, and the present technique is not limited to the ratio. The ratio between the transmission and the reflection of the semi-transmissive mirror 114 may be appropriately set based on a low luminance performance of the AF sensor 140 and the like.

However, in a case where the low luminance performance of the AF sensor 140 can be improved and an AF function is not deteriorated even when the luminance of the entering subject light is low, it is not necessary to provide regions having different transmittances. In this case, it is preferable that a whole area of the semi-transmissive mirror 114 have the uniform transmittance as illustrated in FIG. 7B.

It is preferable that the semi-transmissive mirror 114 have a size which can capture an image having the same size as a subject image captured by the first image sensor 120.

1-2. Live View Display of Image Pickup Device

Next, the live view display of the image pickup device 1000 configured as described above will be described. First, a problem in the live view display in the related art will be described with reference to FIGS. 8A and 8B before the description on the live view display of the present technique.

Figure 8:
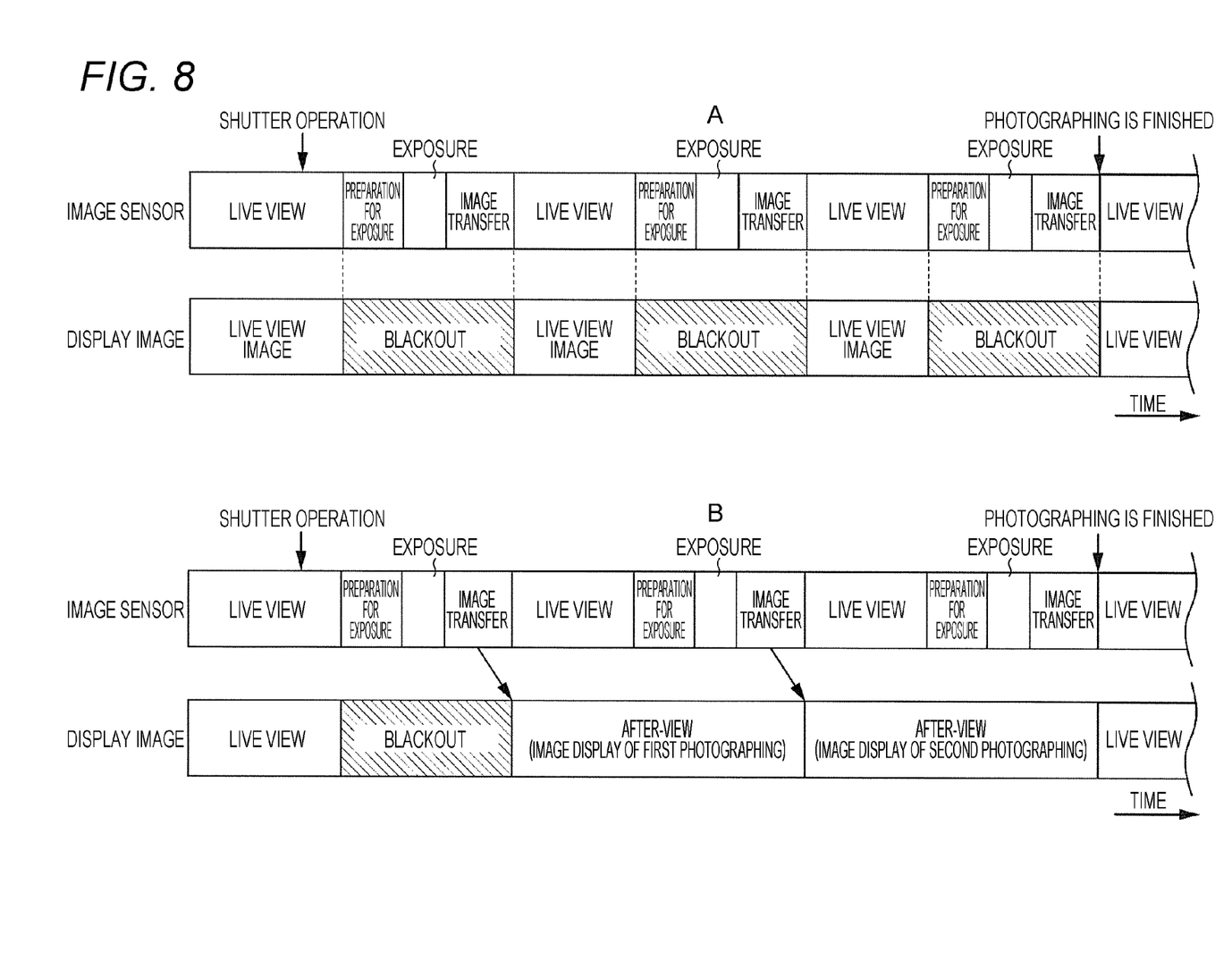
FIG. 8A is a diagram of a first example of a live view display of the related art.
FIG. 8B is a diagram of a second example of the live view display of the related art.

FIG. 8A is a diagram of a first example of the live view display of the related art. FIG. 8B is a diagram of a second example of the live view display of the related art. The upper stages of both FIGS. 8A and 8B respectively indicate the operation of the image sensors for generating the photographing image and the live view image. A lower stage indicates the image displayed on the display unit such as the display. FIGS. 8A and 8B indicates a case where three images are generated by continuous photographing. It is assumed that the time go from left to right in FIGS. 8A and 8B.

Generally, the image generated by the image sensor is displayed on the display unit as the image for the live view until a user performs shutter operation. Accordingly, the user can confirm the subject image in real time.

When the user performs the shutter operation, the image sensor performs a series of the operation to take a photograph. The series of the operation is to switch a mode from a live view display mode to an exposure mode, prepare for exposing, and then, expose, and further, transfer the generated image data to a predetermined processing circuit in the image pickup device.

While the image sensor prepares for exposing, exposes, and transfers the image data, the image generated by the image sensor is not supplied to the display unit and the live view is not displayed on the display unit. Therefore, as illustrated in the lower stage of FIG. 8A, a so-called blackout occurs in which the live view image is not displayed during a period corresponding to the preparation for the exposure, the exposure, and the image data transfer.

FIG. 8B is a diagram of a second example of the live view display of the related art. A point that the image sensor switches the mode from the live view display mode to the exposure mode, prepares for exposing, exposes, and then transfers the image data when the user performs the shutter operation is similar to that of the first example.

In the second example, the blackout occurs similarly to the first example of FIG. 8A in the period of the series of the operation including the preparation for the exposure, the exposure, and the transfer of the image data at a first photographing. However, in the second example, an image generated by the first photographing is displayed as the live view image during a period corresponding to a second photographing. In addition, an image generated by the second photographing is displayed as the live view image during a period corresponding to a third photographing. Accordingly, the occurrence of the blackout can be prevented at the time of the second photographing or later. This method is called as an "after-view".

However, the blackout cannot be completely prevented even when the after-view is used. Also, there is a problem in that the subject does not operate and an uncomfortable feeling is generated in the live view display because a same still image is continuously displayed as the live view.

Figure 9:
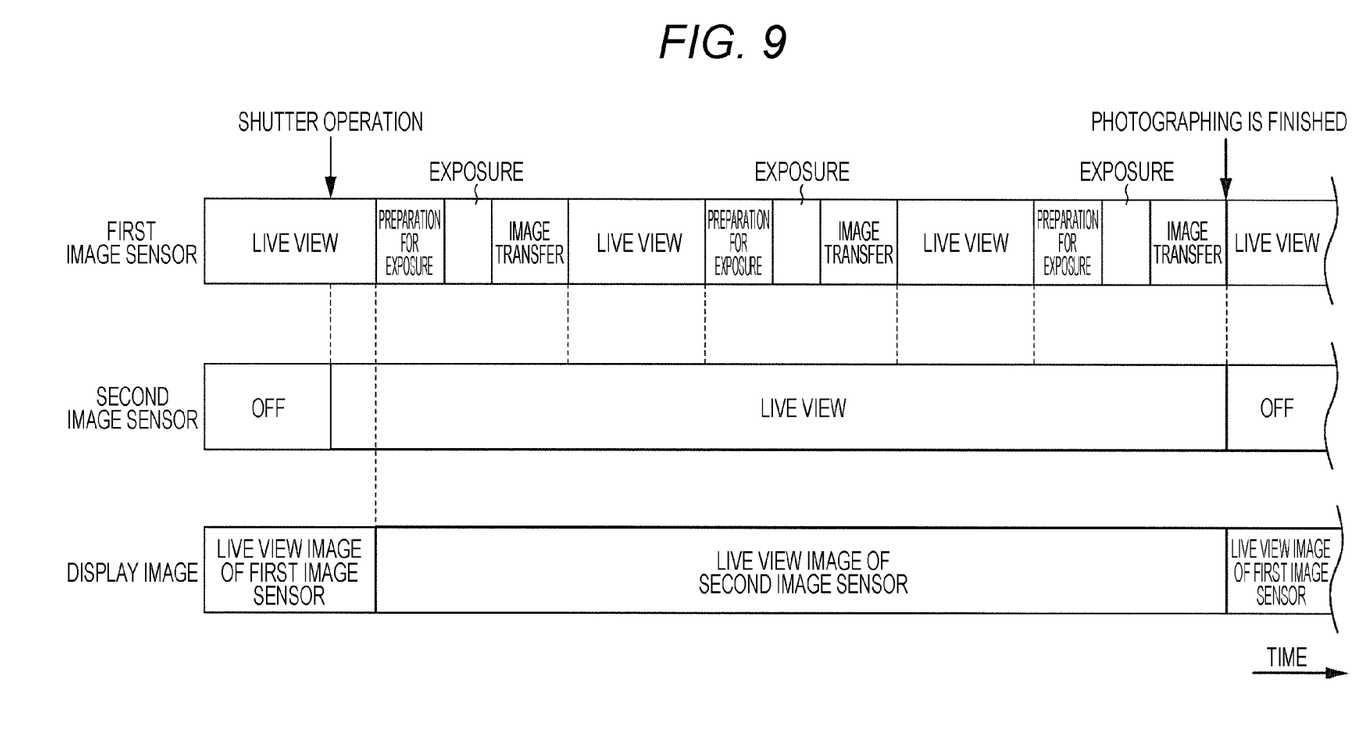
FIG. 9 is a diagram to describe a live view display according to the present technique.

Next, the live view display according to the present technique will be described. The present technique prevents the blackout of the live view display as described above. FIG. 9 is a diagram to describe the live view display according to the present embodiment. The upper stage of FIG. 9 indicates operation of the first image sensor 120. The middle stage indicates operation of the second image sensor 130. The lower stage indicates an image displayed on the display unit 190. FIG. 9 is a case where three images are generated by the continuous photographing. A live view display control which will be described below is performed under the control of the control unit 180. However, the image pickup device 1000 may include a display control unit for performing the live view display control. Also, the display unit 190 itself may perform the live view display control which will be described below.

The image generated by the first image sensor 120 is displayed as the live view image on the display unit 190 until the user performs the shutter operation. Accordingly, the user can confirm the subject image in real time. When the user performs the shutter operation, the first image sensor 120 performs a series of the operation to take a photograph. The series of the operation is to switch a mode from a live view display mode to an exposure mode, prepare for exposing, and then, expose, and further, transfer the generated image data to a predetermined processing circuit in the image pickup device 1000.

The second image sensor 130 is in an off-state until the user performs the shutter operation. When the user performs the shutter operation, the second image sensor 130 is turned on and generates the image for the live view. As illustrated in the lower state of FIG. 9, the live view display on the display unit 190 is switched from the image by the first image sensor 120 to the image by the second image sensor 130. Accordingly, since the live view is displayed by using the image by the second image sensor 130 during a period when the image by the first image sensor 120 cannot be displayed as the live view (period of the preparation for the exposure, the exposure, and the transfer of the image), the blackout does not occur in the live view display. Therefore, the live view display can be constantly performed without interruption.

When the photographing is finished, the live view display on the display unit 190 is switched from the image by the second image sensor 130 to the image by the first image sensor 120, and the second image sensor 130 is turned off. The on/off the second image sensor 130 may be switched by the second image sensor 130 itself and may be switched under the control of the control unit 180.

In the subject light for entering the first image sensor 120, a loss of light quantity is generated when the subject light passes through the semi-transmissive film 112. On the other hand, since the subject light for entering the second image sensor 130 has the loss of light quantity caused by the reflection by the semi-transmissive film 112, the reflection by the semi-transmissive mirror 114, and the transmission of the semi-transmissive film 112, the subject light for entering the second image sensor 130 has smaller light quantity than that of the subject light for entering the first image sensor 120. Therefore, there is a possibility that a difference is generated in image quality, especially in brightness and the user who views the live view has an uncomfortable feeling when the image by the first image sensor 120 is simply switched to the image by the second image sensor 130.

When the image by the second image sensor 130 is displayed as the live view image, it is preferable that the image by the second image sensor 130 be brightly displayed, for example, by increasing a luminance level so that the image by the second image sensor 130 has the image quality, especially the brightness, which is equal to that of the image by first image sensor 120. Accordingly, the brightness of the image by the first image sensor 120 becomes equal to that of the image by the second image sensor 130, and there is no possibility that the user feels the uncomfortable feeling. The luminance level is adjusted, for example, by the camera processing circuit 160 which performs various processing relative to the image.

Figure 10:
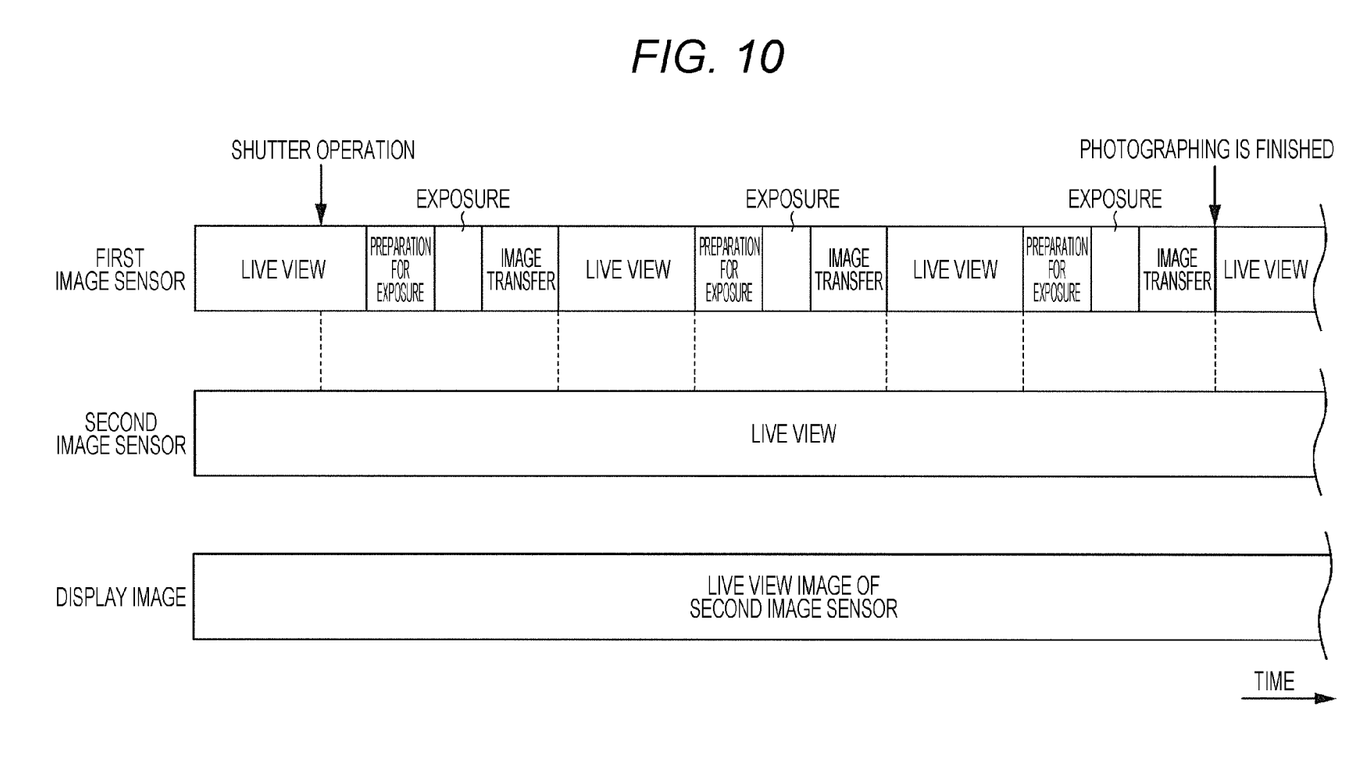
FIG. 10 is a diagram to describe a variation of the live view display according to the present technique.

FIG. 10 indicates a second aspect of the live view display according to the present embodiment. The upper stage of FIG. 10 indicates operation of the first image sensor 120. The middle stage indicates operation of the second image sensor 130. The lower stage indicates an image displayed on the display unit 190. FIG. 10 is a case where three images are generated by the continuous photographing.

In the second example, the image according to the second image sensor 130 is constantly displayed on the display unit 190 as the live view. Also according to the above, since the live view display is performed by using the image by the second image sensor 130 during a period when the image by the first image sensor 120 cannot be displayed as the live view, the blackout does not occur in the live view display. Therefore, the live view display can be constantly performed without interruption.

In the description with reference to FIGS. 9 and 10, the example has been a case where the three images are continuously photographed by the continuous photographing. However, the present technique is not limited to this and can be applied to the continuous photographing of three or more images and a photographing other than the continuous photographing.

3. Variation

One embodiment of the present technique has been specifically described above. However, the present technique is not limited to the above-mentioned embodiment, and various kinds of variations based on technical ideas of the present technique are possible. The present technique may have a configuration below.

(1) An image pickup device including:

a first image sensor configured to photoelectrically convert subject light and generate an image;

a second image sensor configured to photoelectrically convert the subject light and generate an image for a live view;

a first optical member configured to transmit the subject light and allow the subject light to enter the first image sensor, and at the same time, reflect the subject light; and a second optical member configured to lead the subject light reflected by the first optical member to the second image sensor and allow the subject light to enter the second image sensor.

(2) The image pickup device according to (1), further including:

a display unit configured to display the image generated by the first image sensor and the image generated by the second image sensor as a live view image.

(3) The image pickup device according to (2), wherein the display unit displays the image generated by the second image sensor when the first image sensor is in exposure operation.

(4) The image pickup device according to (2) or (3), wherein the display unit displays the image generated by the second image sensor when the first image sensor is transferring the image.

(5) The image pickup device according to any one of (2) to (4), wherein the display unit displays the image generated by the second image sensor when the first image sensor is in continuous photographing operation.

(6) The image pickup device according to any one of (2) to (5), wherein the image generated by the second image sensor is displayed on the display unit so that an image quality of the image generated by the second image sensor becomes almost equal to that of the image generated by the first image sensor.

(7) The image pickup device according to any one of (1) to (6), wherein the second optical member includes an optical surface having a predetermined radius of curvature.

(8) The image pickup device according to any one of (1) to (7), wherein the second optical member is a semi-transmissive mirror, and a surface apart from the first image sensor is a reflection surface.

(9) The image pickup device according to any one of (1) to (8), wherein the second optical member has a size capable of covering at least a subject image region captured by the first image sensor.

(10) The image pickup device according to any one of (1) to (9), further including a sensor for auto-focusing, wherein the second optical member allows the subject light to enter the sensor for auto-focusing and the second image sensor by transmitting and reflecting the subject light.

(11) The image pickup device according to any one of (1) to (10), wherein the second optical member includes a first region and a second region having lower transmittance than that of the first region.

(12) An image display method, including displaying an image generated by a first image sensor and an image generated by a second image sensor as a live view image in an image pickup device including:

the first image sensor for photographically converting subject light and generating the image;

the second image sensor for photographically converting the subject light and generating the image for the live view;

a first optical member for transmitting the subject light and allowing the subject light to enter the first image sensor, and at the same time, reflecting the subject light;

a second optical member for leading the subject light reflected by the first optical member to the second image sensor and allowing the subject light to enter the second image sensor; and a display unit for displaying the image.

REFERENCE SIGNS LIST

120 first image sensor
130 second image sensor
112 semi-transmissive film
114 semi-transmissive mirror
190 display unit
114A reflection surface
114B first transmission region
114C second transmission region
1000 image pickup device

The invention claimed is:

1. An image pickup device, comprising:
   a first image sensor configured to photoelectrically convert subject light and generate a first image;
   a second image sensor configured to photoelectrically convert the subject light and generate a second image for a live view;
   an auto focus sensor;
   a semi-transmissive film configured to transmit the subject light and allow the subject light to enter the first image sensor, and at the same time, reflect the subject light;
   a semi-transmissive mirror configured to reflect a part of the subject light reflected by the semi-transmissive film to the second image sensor and transmit a part of the subject light reflected by the semi-transmissive film to the auto focus sensor,
   wherein the semi-transmissive mirror includes an optical surface that has a determined radius of curvature.

2. The image pickup device according to claim 1, further comprising:
   a display panel configured to display the first image generated by the first image sensor and the second image generated by the second image sensor as a live view image.

3. The image pickup device according to claim 2, wherein the display panel is configured to display the second image generated by the second image sensor in an event the first image sensor is in exposure operation.

4. The image pickup device according to claim 2, wherein the display panel is configured to display the second image generated by the second image sensor in an event the first image sensor transfers the first image generated by the first image sensor.

5. The image pickup device according to claim 2, wherein the display panel is configured to display the second image generated by the second image sensor in an event the first image sensor continuously photographs.

6. The image pickup device according to claim 2, wherein the second image generated by the second image sensor is displayed on the display panel so that brightness of the second image generated by the second image sensor becomes equal to that of the first image generated by the first image sensor.

7. The image pickup device according to claim 1, wherein a surface, of the semi-transmissive mirror, closer to the auto focus sensor is a reflection surface.

8. The image pickup device according to claim 1, wherein the semi-transmissive mirror has a size that covers at least a subject image region captured by the first image sensor.

9. The image pickup device according to claim 1, wherein the semi-transmissive mirror includes a first region and a second region, wherein the second region has lower transmittance than that of the first region.

10. An image display method, comprising:

photographically converting, by a first image sensor, subject light and generating a first image;

photographically converting, by a second image sensor, the subject light and generating a second image for a live view;

transmitting, by a semi-transmissive film, the subject light and allowing the subject light to enter the first image sensor, and at the same time, reflecting, by the semi-transmissive film, the subject light;

reflecting, by a semi-transmissive mirror, a part of the subject light reflected by the semi-transmissive film to the second image sensor; and transmitting, by the semi-transmissive mirror, a part of the subject light reflected by the semi-transmissive film to an auto focus sensor, wherein the semi-transmissive mirror includes an optical surface having a determined radius of curvature; and displaying, by a display panel, the first image generated by the first image sensor.

\* \* \* \* \*